2,806,531
Patented Sept. 17, 1957

2,806,531
COMPOSITION FOR TREATING WELLS AND METHOD FOR USING SAME

Bryan E. Morgan and Gerald G. Priest, Houston, Tex., assignors, by mesne assignments, to Esso Research and Engineering Company, Elizabeth, N. J., a corporation of Delaware No Drawing. Application December 19, 1955, Serial No. 554,109

16 Claims. (Cl. 166—29)

The present invention is directed to a method for sealing zones in a well in which fluids are lost. More particularly, the invention is concerned with a method for preventing fluid loss during well drilling operations. In its more specific aspects, the invention is concerned with cementing a well.

The present invention may be briefly described as a cementing composition for use in wells which comprises a pumpable slurry of Portland cement, substantially anhydrous calcium chloride and a hydrocarbon.

The invention also includes a method for cementing a well employing the composition in which a pumpable slurry of Portland cement, substantially anhydrous calcium chloride and a hydrocarbon is formed and then pumping the slurry into the well whereby the well is cemented by flash setting of the cement.

The invention also includes a method of preventing loss of drilling fluid in the drilling of a well in which drilling fluid is circulated down a hollow drill stem, out through the drill bit attached thereto and thence up through the annulus between the drill stem and the wall of the well which comprises replacing the circulating drilling fluid with a pumpable slurry of Portland cement, substantially anhydrous calcium chloride and a hydrocarbon when excessive amounts of drilling fluid are being lost to a zone penetrated by the drill bit whereby said zone is sealed by flash setting of said slurry in said zone, and thereafter resuming circulation of the drilling fluid in said well while drilling the well.

The composition may suitably include liquid hydrocarbon which may be a pure hydrocarbon or it may be a mixture of hydrocarbons. The liquid hydrocarbon may be a crude petroleum or it may be a fraction of crude petroleum, such as gasoline, kerosene, gas oil or a diesel oil fraction. It may be desirable to use crude petroleum, such as is found in adjacent oil wells in the field where the cementing operation is conducted or, under some conditions, it may be desirable to use a fuel oil which may be a kerosene or diesel oil.

The liquid hydrocarbon as described may be employed in an amount in the range from about 50 cc. to about 300 cc. per 100 grams of dry cement. A preferred amount is in the range from about 100 cc. to about 180 cc. per 100 grams of the dry cement. The oil is a liquid hydrocarbon and may have a suitable viscosity to provide a pumpable slurry; the viscosity may vary over a wide range and may be as high as about 100 centipoises at 100° F. The oil or hydrocarbon should remain liquid under conditions of use.

The calcium chloride employed is substantially anhydrous calcium chloride and is used with the cement in amounts to provide a cement to calcium chloride weight ratio in the range from about 1:1 to about 20:1.

The composition of the present invention is placed or located in the well either by pumping downwardly through the well or by lowering in a dump bailer and suitably is substantially free of water. The composition of the present invention is a composition which will set substantially immediately by contact with interstitial water in the formation, zone, interval, sand, or horizon wherein fluid is being lost or it may be caused to set by providing in the composition a suitable amount of an inorganic compound containing water of hydration which will release the water of hydration at well temperatures.

As examples of inorganic compounds which may be employed may be mentioned the inorganic salts containing water of hydration such as $CaCl_2.6H_2O$, $CaO_2.8H_2O$, $Na_2CO_3.10H_2O$, $Fe(NO_3)_3.9H_2O$, $MgCl_2.6H_2O$ $MgSO_4.7H_2O$, $Na_2SO_4.10H_2O$, and the like. For example, the hydrate of the calcium chloride mentioned above releases 4 molecules of water at 30° C., the hydrate of calcium oxide releases 8 molecules of water at 100° C. and the hydrate of sodium carbonate releases 5 molecules of water at 34° C. Temperatures in this range and higher up to about 200° C. are encountered in well drilling operations and by incorporating an inorganic compound of the nature described in the composition, water may be released to provide water for flash setting of cement. Ammonium chloride and calcium hydroxide, for example, may be reacted to form calcium chloride, ammonia, and water; thus by including an ammonium chloride in the composition or by adding same thereto, flash setting may be accomplished.

It may also be desirable to add to the composition a sufficient amount of Bentone to impart gel strength characteristics to reduce filtration rate and to control the density of the composition.

Bentone is the reaction product of organic bases with bentonite. The reaction is a base exchange reaction. Bentone may be prepared by treating a water slurry of high-grade sodium bentonite with one of the larger quaternary ammonium complexes, for example, the water soluble salts, such as octadecylammonium chloride or dioctadecylammonium chloride, and the like. An ion exchange reaction takes place to produce a flocculated organophilic bentonite. This product, commonly called a Bentone, is recovered by filtering, washing, drying, and regrinding. A description of the Bentones may be found in Chemical Engineering, March 1952, pages 226 to 230. Bentone is capable of swelling in hydrocarbons similar to the action of bentonite in water.

These same properties may be controlled in the composition by the emulsification of a hydrocarbon-insoluble liquid into the composition as the internal phase of an emulsion. Thus with good emulsification, water may be a desirable liquid for this purpose. When the hydrocarbon-insoluble liquid is the internal phase and water is employed, the film properties of the emulsion prevent the water from flash setting the cement. Suitable water-in-oil emulsifying agents may be employed and as examples of suitable emulsifying agents may be mentioned sorbitan mono-oleate, sorbitan sesquioleate, polyoxyethylene sorbitol tetraoleate and polyoxyethylene sorbitol 4-5 oleate which may be used to form and stabilize the emulsion.

The compositions employed in the practice of the present invention may suitably include a wetting agent or a compound to aid and hasten the wetting of the cement particles by the interstitial or released water. Suitable surfactants that promote water-wetting may be mixed with the cement prior to the addition of the suspending medium or afterwards. For example, the aerosols, aryl alkyl sulfonates and sulfates, sorbitan laurates and palmitates and stearates, polyoxyalkylene ethers and esters of these acids, such as sulfonic, sulfuric, lauric, palmitic, stearic, and the like may be used. Mixtures and combinations of these several surfactants or wetting agents may be used.

It is also possible to incorporate in the composition a suspending liquid or fluid which will not react with the cement but which is soluble in water or soluble both in the oil and the water. Examples of such compounds are the aliphatic alcohols, ketones, and the like. As examples of such alcohols and ketones may be mentioned methyl, ethyl, and propyl alcohols, butyl alcohols, amyl alcohols and the higher members of the series, as well as acetone, methylethyl ketone, diethyl ketone, and many more too numerous to mention here.

The composition may suitably include shredded cellophane, expanded perlite, chopped leather, straw, nut hulls, cotton seed hulls, clays, bentonite, and many organic and inorganic filler materials, such as waste animal products and the like. When clays or bentonites are used, amounts in the range between 1.0% and 50.0% by weight of the cement may be employed. Under most circumstances 1% to 5% may be used but some instances may require a ratio of clay or bentonite to cement of 1:1.

In order to illustrate the invention further, 400 parts by weight of an ASTM Type I Portland cement and 200 parts by weight of anhydrous calcium chloride of approximately 8 mesh were dry admixed. The dry mixture was added to diesel oil while stirring the oil vigorously until a fluid suspension was obtained. A portion of this suspension was placed in a vessel and a small amount of water was added. The resulting mixture was stirred slowly and after about 1 minute of stirring heat was evolved and the mixture thickened; within a few seconds the mixture developed definite rigidity and mechanical strength. Within 10 minutes setting, the cement mass was coherent and quite hard.

Thus, the present invention is directed specifically to a composition which after placement in a wellbore develops mechanical strength quickly and has desirable properties. The composition comprises a hydraulic cement and calcium chloride which is an accelerator for the hydraulic cement and a liquid suspending medium in which the cement and accelerator are insoluble. The suspending member is suitably a hydrocarbon oil, as mentioned before. The composition has unique qualities in that on contact with interstitial water and the like from the formation or in situ formed or released water the Portland cement is accelerated such that flash setting is obtained by the presence of calcium chloride.

The composition may be suitably modified as set out before such that on exposure to well temperatures water of hydration may be released from a component of the composition such that it will have in situ formed water which will cause flash setting of the cement.

In utilizing the present invention, a borehole or well is drilled from the earth's surface to penetrate subsurface earth formations. A hollow drill stem which is made up of sections of drill pipe is rotated by a rotary table and carries on its end a drill bit. Drilling fluid, such as aqueous or oily suspension of colloidal material, such as clay, which may contain the usual additives in drilling mud, if desirable, is circulated down the hollow drill stem and out through eyes or passageways in the drill bit attached to the drill stem and upwardly through the well bore into the annulus between the drill stem and the wall of the well. During such operations, cavernous and open-fissured formations, coarsely permeable formations, and faulted, jointed and fissured formations may be penetrated. Often such formations are capable of receiving large quantities of drilling mud. This condition is commonly referred to as "lost-returns" because the drilling mud pumped down the drill pipe fails to return to the surface. It is a serious condition not only because of the loss of large quantities of drilling fluid but also because control of formation pressures is impossible. In accordance with the practice of the present invention when the fluid loss from the drilling mud or fluid is above about 10% of the fluid or mud being returned to the earth's surface, it is desirable to terminate the drilling operation and the circulation of drilling mud and replace the drilling mud by the improved composition. In other words, a cement slurry of the nature described is pumped down the drill stem and out the eyes of the drill bit into the region where lost returns is being encountered or where fluid filtration is resulting. On contact of the particular slurry with the interstitial water or the water in the formation or on the composition reaching the well temperature, water of hydration is released and the slurry sets up rapidly to seal the zone of lost returns. This happens substantially immediately on contact with the water, whether it be the interstitial or formation water or whether it be the water released in situ from the inorganic compounds containing water of hydration. After the zone of lost returns has been suitably sealed, the drilling operations and circulation of drilling fluid are resumed by rotating the drill stem and drill bit and pumping drilling mud down the drill stem.

The present invention is very advantageous in that heretofore zones of lost returns were sealed, if at all, only after tedious and expensive procedures. The greatest disadvantage of the prior art methods was the necessity of waiting for several hours after treatment of a particular zone before normal operations could be resumed. In the present invention, the mechanical strength is developed substantially immediately after placement of the improved composition which allows sealing of the zone and nearly instantaneous resumption of operation. Thus the present invention is quite advantageous and of great utility.

The nature and objects of the present invention having been completely described and illustrated, what we wish to claim as new and useful and to secure by Letters Patent is:

1. A cementing composition for use in wells having the property of setting substantially immediately on contact with water which consists of a pumpable hydrocarbon slurry of Portland cement and substantially anhydrous calcium chloride, the weight ratio of said cement to said calcium chloride being in the range from about 1:1 to about 20:1, said hydrocarbon in said slurry being employed in an amount in the range from about 50 cc. to about 300 cc. per 100 grams of said cement in a dry condition.

2. A method for cementing a well which comprises forming a pumpable hydrocarbon slurry consisting of said hydrocarbon, Portland cement and substantially anhydrous calcium chloride, the weight ratio of said cement to said calcium chloride being in the range from about 1:1 to about 20:1, said hydrocarbon in said slurry being employed in an amount in the range from about 50 cc. to 300 cc. per 100 grams of said cement in a dry condition, pumping said slurry into said well, and then contacting said slurry with water whereby said well is cemented substantially immediately on contact of the slurry with said water by flash setting of said cement.

3. A composition in accordance with claim 1 in which the hydrocarbon is diesel oil.

4. A composition in accordance with claim 1 which contains a filler material.

5. A composition in accordance with claim 1 in which an inorganic compound containing water of hydration is present in the slurry in an amount sufficient to cause flash setting of said slurry by release of said water of hydration at well temperatures.

6. A composition in accordance with claim 1 which contains a reaction product resulting from treating a water slurry of high grade sodium bentonite with one of the larger quaternary ammonium complexes.

7. A composition in accordance with claim 1 which contains a wetting agent.

8. A composition in accordance with claim 1 which contains a water and oil soluble oxygenated organic suspending liquid.

9. A composition in accordance with claim 1 in which water is present as the internal phase of an emulsion of said slurry.

10. A method in accordance with claim 2 in which the slurry contains clay.

11. A method in accordance with claim 2 in which the slurry contains an inorganic compound containing water of hydration and the slurry is set by contact with water of hydration released by said inorganic compound on reaching the temperature of the well.

12. A composition in accordance with claim 5 in which the inorganic compound is $CaCl_2.6H_2O$.

13. A composition in accordance with claim 5 in which the inorganic compound is $CaO_2.8H_2O$.

14. A composition in accordance with claim 5 in which the inorganic compound is $Na_2CO_3.10H_2O$.

15. A composition in accordance with claim 5 in which the inorganic compound is $MgCl_2.6H_2O$.

16. A composition in accordance with claim 5 in which the inorganic compound is $Na_2SO_4.10H_2O$.

References Cited in the file of this patent

UNITED STATES PATENTS

| | | |
|---|---|---|
| 1,772,999 | Huber | Aug. 12, 1930 |
| 2,030,518 | Guibert | Feb. 11, 1936 |
| 2,065,512 | Cannon | Dec. 29, 1936 |
| 2,146,480 | Kennedy | Feb. 7, 1939 |
| 2,248,636 | Marsden | July 8, 1941 |
| 2,611,714 | Witt | Sept. 23, 1952 |

OTHER REFERENCES

Dowell advertisement opposite page 9 of the April 1955 issue of the Journal of Petroleum Technology.